United States Patent
Holm

[15] 3,664,419
[45] May 23, 1972

[54] OIL RECOVERY METHOD USING CRUDE OIL BASE SOLUBLE OIL COMPOSITIONS

[72] Inventor: Leroy W. Holm, Fullerton, Calif.

[73] Assignee: Union Oil Company of California, Los Angeles, Calif.

[22] Filed: July 22, 1970

[21] Appl. No.: 57,327

[52] U.S. Cl. ..........................166/274, 166/273, 166/305 R
[51] Int. Cl. ...........................................................E21b 43/22
[58] Field of Search ..................166/273, 274, 275, 305 R; 252/8.55 D

[56] References Cited

UNITED STATES PATENTS

| | | | |
|---|---|---|---|
| 3,254,714 | 6/1966 | Gogarty et al. | 166/274 |
| 3,275,075 | 9/1966 | Gogarty et al. | 166/274 |
| 3,297,085 | 1/1967 | Herring | 166/273 |
| 3,477,511 | 11/1969 | Jones et al. | 166/274 |
| 3,500,918 | 3/1970 | Holm | 166/273 |
| 3,500,919 | 3/1970 | Holm | 166/274 X |
| 3,537,520 | 11/1970 | Holm | 166/273 |
| 3,537,523 | 11/1970 | Gogarty et al. | 166/305 R |
| 3,554,289 | 1/1971 | Webb | 166/305 R |
| 3,557,873 | 1/1971 | Owens | 166/274 |

*Primary Examiner*—Stephen J. Novosad
*Attorney*—Milton W. Lee, Richard C. Hartman, Lannas S. Henderson, Dean Sandford and Robert E. Strauss

[57] ABSTRACT

Improved crude oil base soluble oils are prepared from crude oils exhibiting gravities between about 27° and 50° API and pour points below about 55° F. These soluble oil compositions contain about 45 to 90 volume percent of the selected crude oil, 4 to 30 volume percent surface active agents, 0.5 to 8 volume percent of a partially oxygenated liquid organic stabilizing agent, and up to about 60 volume percent water. Both the substantially anhydrous soluble oil containing only incidental water and the high water content microemulsions formed by the addition of from about 10 to 60 volume percent water to the soluble oil can be employed as miscible flooding agents for oil recovery and as water injection and producing oil well treating agents.

16 Claims, No Drawings

OIL RECOVERY METHOD USING CRUDE OIL BASE SOLUBLE OIL COMPOSITIONS

This invention relates to the recovery of oil from subterranean petroleum reservoirs, and more particularly to improved soluble oil compositions useful as displacement fluids in a flooding process for the recovery of petroleum and as well treating agents for treating water injection and producing oil wells.

It has long been recognized that substantial amounts of oil remain unrecovered at the completion of normal primary recovery operations. Hence, various secondary methods of recovering additional quantities of oil have been proposed, such as the well-known technique of water flooding in which water is injected into the reservoir through an injection well to drive additional oil towards one or more production wells spaced apart in the reservoir from the injection well. Although an additional quantity of oil can often be recovered by water flooding, the efficiency of the water flood and the ultimate oil recovery can be further improved by introducing into the reservoir ahead of the flood water, a solvent that is miscible with the connate oil.

One particular solvent system that has been suggested for use with a water drive comprises a mixture of substantially anhydrous soluble oil and an inert, nonaqueous solvent, preferably admixed in such proportions that the viscosity of the mixture approximates the viscosity of the formation oil. The soluble oil consists of a hydrocarbon phase; one or more soaps or non-soap surface active materials; and a stabilizing agent which is usually a monohydric or polyhydric alcohol, or other partially oxygenated, low molecular weight organic liquid, such as a ketone. The soluble oil often contains some free organic acid, and especially a fatty acid, such as oleic acid.

Other soluble oil compositions proposed for use in oil recovery operations comprise admixtures of a hydrocarbon liquid, such as crude oil or a refined or semi-refined petroleum product; a surface active agent such as an alkyl aryl sulfonate or a mixture of such agents; an organic liquid stabilizing agent; and minor amounts of water, such as usually less than about 10 volume percent.

It has also been proposed that the flood water be preceded by a microemulsion consisting of a soluble oil containing substantial quantities of water, such as from about 10 to 50 volume percent or more water. These microemulsions are relatively stable, transparent emulsions of the water-in-oil type, i.e., oil is the continuous phase and small droplets of water are dispersed therein.

Also, it has been proposed to use these substantially anhydrous soluble oils and microemulsions to treat water injection wells to remove oil blockage from the formation immediately surrounding the injection well, and to treat producing wells to remove water blockage and organic sludge from the formation immediately surrounding the well.

While the foregoing anhydrous soluble oils and microemulsions are effective in recovering more oil than recovered by conventional water flooding and in stimulating both water injection and producing wells, it is nevertheless desirable to even further optimize these compositions to render them less costly and to improve the efficiency of the processes in which they are employed.

Accordingly, a principal object of this invention is to provide an improved miscible flooding process for the recovery of petroleum from subterranean reservoirs. Another object of the invention is to provide a process for improving the water injectivity of water injection wells. Still another object of the invention is to provide a process for improving the productivity of producing oil wells. A further object of this invention is to provide improved crude oil base soluble oil compositions useful as displacement fluids in an oil recovery process and as treating agents in the stimulation of water injection and producing oil wells. A still further object is to provide an improved crude oil base soluble oil that on the addition of water thereto produces a high quality, stable, transparent microemulsion. Other objects and advantages of the invention will be apparent from the following description.

Briefly, this invention contemplates an improved soluble oil composition comprising an admixture of a crude oil exhibiting a gravity between about 27° and 50° API and a pour point below about 55° F., a surface active agent and a partially oxygenated liquid organic stabilizing agent. The soluble oil can be substantially anhydrous, or it can contain water present in the form of a water-in-oil microemulsion. The composition can be employed as a miscible displacement fluid for oil recovery, in which case a quantity of the composition is injected into an oil-bearing reservoir ahead of a water drive, and as a well treating agent to remove oil blockage from the formation around a water injection well and to remove water blockage and organic sludge from the formation around a producing oil well.

The soluble oils used herein are oleaginous compositions which are miscible with the connate oil and have the ability to spontaneously emulsify with water when admixed therewith, their emulsibility with water depending in part upon the salt content of the water, lower salt content water being more readily emulsified. These soluble oils comprise a liquid hydrocarbon, one or more selected surface active agents, and optionally a stabilizing agent. The emulsions formed by the addition of water to a soluble oil are of the water-in-oil type, in that, at water concentrations less than the inversion concentration, oil is the continuous phase and the water is dispersed in the oil in the form of very fine droplets or micelles, which are less than about 0.1 micron in size, and usually range in size from about 100 to 600 Å. These emulsions are generally transparent in appearance, and are stable in that they remain as microemulsions on aging, and do not separate into visibly distinct separate phases on storage at temperatures within a specified range, the specific temperature range depending on the particular soluble oil composition. By transparent, it is meant that the microemulsions do not have a cloudy or opaque appearance, even though they may contain color bodies. It is recognized, of course, that some cloudiness may appear at certain water concentrations without adversely effecting the utility of the microemulsion in removing oil from that portion of the formation which it contacts. Emulsions of this type are designated microemulsions to distinguish them from ordinary water-in-oil macroemulsions in which the lower limit in the size of the water droplets is about 0.1 micron. At water concentrations above the inversion concentration, the emulsion inverts to an emulsion of the oil-in-water type in which droplets of oil are dispersed in a continuous water phase.

One of the major constituents of the soluble oil composition of this invention is a crude petroleum that exhibits a gravity of about 27° to 50° API and a pour point below about 55° F. This constituent can be a crude oil previously recovered from the reservoir to be treated where the produced crude oil is of the requisite quality, or it can be another conveniently available crude oil selected to meet these quality limitations. It has been discovered that crude oils having gravities below about 27° API or above about 50° API do not form satisfactory soluble oils, and that crude oils having gravities within the preferred range of about 27° to 50° API are unsatisfactory as the base constituent for the formulation of soluble oils if the pour point of the crude oil is above about 55° F. Thus, the compositions of this invention are formulated with crude oils exhibiting gravities of about 27° to 50° API. and pour points below about 55° F.

The terms "gravity" and "API gravity" as employed herein is the gravity in ° API as determined by ASTM test method D287-67 entitled "API Gravity of Crude Petroleum and Petroleum Products (Hydrometer Method)," *ASTM Standards*, American Society for Testing and Materials, Part 18, Oct., 1969, pages 81-85, which procedure is herein incorporated by reference.

The term "pour point" as employed herein is the pour point in degrees Fahrenheit (°F.) as determined by ASTM test method D97-66 entitled "Pour Point," *ASTM Standards*, ibid, pages 30-34, which procedure is herein incorporated by reference.

Surface active materials which can be used are those that when admixed with the liquid hydrocarbon cause the information of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar groups in a surfactant material expressed by a numerical value designated HLB number. The spreading coefficient is an indication of the facility with which one liquid spreads upon another liquid. Spreading coefficients greater than zero indicate that the first liquid will spread on the second, and coefficients less than zero indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene monosulfonates and alkyl sodium polyaryl monosulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weights of less than about 400 or which contain more than one sulfonic acid group per molecule. It has been found that in soluble oils compounded from petroleum crude oil or other high boiling hydrocarbons, superior results are obtained by employing as the preferentially oil-soluble organic sulfonate an alkyl aryl monosulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl monosulfonate or mixture of monosulfonates which in the form of their sodium salts have molecular weights of more than about 400, and a preferentially water-soluble organic sulfonate, such as an alkyl aryl sulfonate or mixture of monosulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl monosulfonate which in the form of its sodium salt has molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction on sulfonation mixtures of alkyl aryl, monosulfonates are produced which may be either preferentially water-soluble or preferentially oil-soluble. The term "petroleum sulfonates" is a commercial designation of sulfonates which are obtained by a treatment of petroleum fractions, particularly solvent treated aromatic fractions, with sulfuric acid, fuming sulfuric acid or sulfur trioxide, followed by neutralization to form the sulfonates. Upon sulfonation, two general types of products are formed which are designated mahogany acids and green acids. The terminology is based on the colors imparted to the respective oil and water phases produced in the sulfonation process, a brownish color being imparted to the oil phase by oil-soluble sulfonic acids and a greenish color being imparted to the aqueouos phase by the water-soluble sulfonic acids. The mahogany acids and green acids can be neutralized to form mahogany sulfonates and green sulfonates. The mahogany sulfonates are preferentially oil-soluble, and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water-soluble agent. Although the optimum surfactant combination is dependent upon the characteristics of the particular reservoir, in many operations it is found the superior results are obtained with a surfactant combination containing about 1 to 4 parts of preferentially oil-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated organic liquids such as monohydric and polyhydric alcohols, ketones, ethers and polyhydric alkyl-ethers. Specific agents found particularly useful include isopropyl alcohol, secondary butyl alcohol, methyl ethyl ketone, glycol monoethyl ether (Cellosolve), glycol monobutyl ether (butyl Cellosolve), and diethylene glycol monobutyl ether (butyl Carbitol). The names "Cellosolve" and "Carbitol" are trademarks of the Union Carbide Corporation.

In one embodiment, the soluble oils employed in the practice of the invention are substantially anhydrous in that they contain little, if any, added water. However, it is well known that some of the ingredients from which soluble oils are compounded, such as the crude oil, the stabilizing agent, and the petroleum sulfonates, can contain minor proportions of water, and that it is difficult and costly to dehydrate these agents to remove all traces of water. Also, it may be advantageous when compounding the soluble oil to add a small amount of water to the composition. Thus, it is within the scope of this embodiment of the invention to employ anhydrous and substantially anhydrous soluble oils as a displacement fluid in an oil recovery operation and as a treating fluid for stimulating water injection and producing oil wells. The term "substantially anhydrous" as used herein is meant to include soluble oils having not more than minor amounts of water. More particularly, these soluble oils contain less than 10 volume percent water, and preferably less than about 5 volume percent water. In any event, the substantially anhydrous soluble oils are to be distinguished from microemulsions containing substantial quantities of water, such as from about 10 to 60 percent or more water.

In another embodiment of the invention, high water content microemulsions are employed as displacement fluids in oil recovery operations and as treating agents for stimulating water injection and producing oil wells. These microemulsions are prepared by the addition of water to the aforedescribed substantially anhydrous soluble oils. The high water content microemulsions of this embodiment can contain water in an amount up to that amount that causes inversion of the water-in-oil microemulsion to an oil-in-water microemulsion, and these microemulsion typically contain from about 10 to 60 volume percent water.

The soluble oil compositions useful in the practice of this invention can be prepared by any of the conventional techniques. One suitable method of preparing these compositions is to first admix the selected crude oil, surface active material and stabilizer in the desired proportions to form an anhydrous soluble oil containing only incidental water. Thereafter, if desired, water can be added to the substantially anhydrous soluble oil to form a microemulsion of the desired water content. Preferably, the water employed in forming the microemulsion is a salt-containing fresh water having a dissolved salt content of less than about 6,000 ppm.

Thus, in a preferred embodiment of this invention, crude petroleum having a gravity between about 27° and 50° API and a pour point below about 55° F.; a surface active agent, such as a mixed alkyl aryl petroleum sulfonate; and a stabilizing agent, such as secondary butyl alcohol, glycol monoalkyl ether, or other partially oxygenated organic stabilizing agent; and water are admixed to obtain a soluble oil comprised of about 45 to 90 volume percent crude oil, 4 to 30 volume percent surface active material, 0.5 to 8 volume percent partially oxygenated organic stabilizing agent, and up to 60 volume percent water.

The soluble oil and microemulsion compositions prepared in the foregoing manner are employed in a flooding process by injecting the composition into the reservoir through one or more injection wells in an amount sufficient to establish in the reservoir a miscible bank which can be displaced through the reservoir. Satisfactory oil recoveries can usually be obtained by the injection of 0.01 to 0.15 reservoir pore volumes of soluble oil. Aqueous flooding medium is then injected to displace the soluble oil toward at least one production well spaced apart in the reservoir from the injection well.

More specifically, a slug of the improved soluble oil composition in the form of a substantially anhydrous liquid or a water-in-oil microemulsion is injected into the reservoir through one or more injection or input wells penetrating the oil-bearing formation and forced through the reservoir by subsequently injected flood water toward at least one production or output well similarly completed in the reservoir. As the miscible flooding medium passes through the reservoir, it displaces residual oil therein and moves it into the producing well whereupon the oil can be recovered by conventional means. The injection and producing wells can be arranged in any convenient pattern designed to achieve maximum contact of the oil-bearing zones by the advancing flood front, such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can be arranged in a line substantially parallel to the line of injection wells.

The aqueous flooding medium can comprise water or brine, and can be made more viscous by the addition of a thickening agent such as sugar, dextran, carboxymethyl cellulose, amines, glycerine, guar gum and mixtures of these agents. Also, the aqueous flooding medium can be rendered more viscous by the addition of a small amount of the water-soluble polymer, such as polyacrylamide, acrylic acid-acrylamide copolymer, acrylic acid-acrylamide-diacetone acrylamide terpolymer, and partially hydrolyzed polyacrylamide.

In a preferred method of practicing this invention, thickening agent is added to only an initial portion of the flood water. Thus, in this preferred embodiment, 0.01 to 0.15 reservoir pore volume of soluble oil is injected into the reservoir and followed by 0.1 to 0.8 reservoir pore volume of thickened aqueous flooding medium. Thereafter, water or brine is injected to drive the previously injected fluids toward at least one spaced production well.

It is well known that the permeability of the formation around a water injection well to water can be increased by reducing the oil saturation of the formation. Oil can be removed from that part of the formation immediately surrounding the well by introducing into the well one or more small quantities of the substantially anhydrous soluble oil or microemulsion compositions of this invention, and thereafter injecting water through the well to displace the previously injected fluids outwardly into the formation. Because of the radial flow system involved in injecting fluids from a well outwardly into a surrounding permeable formation, that portion of the formation immediately adjacent to the well is most critical with respect to restricting the rate of injection of water into the formation. Hence, the restriction on the flow of water from the well into the formation due to oil blockage can be substantially reduced by removing oil from only that portion of the formation immediately adjacent the well. Oil blockage can be effectively minimized by removing oil from the strata of a formation into which water is to be injected to a distance of 5 to 10 feet from the well.

In the practice of this embodiment of the invention to improve the water injectivity of a water injection well, one or more slugs of the substantially anhydrous soluble oil or microemulsion compositions of this invention are introduced into the well preferably in an amount not to exceed 3.0 barrels per foot of vertical thickness of the reservoir. Where a plurality of small slugs of the soluble oil or microemulsion are employed, the separate slugs are introduced into the well alternately with a small volume of low-salt content water. Each separate successive volume of soluble oil is introduced into the well in an amount equivalent to between about 0.1 to 1.5 barrels per foot of vertical thickness of the reservoir penetrated by the well.

In this manner, residual oil can be substantially completely removed from the formation adjacent to the well by alternately introducing successive small quantities of soluble oil and low salt-content water into the well, and subsequently injecting flood water to displace the soluble oil outwardly into the formation. By "substantially completely removed" it is meant that the oil content of the formation is reduced to less than about 5 percent of the pore volume, and more preferably to less than about 3 percent.

Also, the soluble compositions of this invention can be employed to reduce water blockage and to remove organic sludge from the formation immediately surrounding the well. In the practice of this embodiment of the invention, about 0.5 to 3 barrels substantially anhydrous soluble oil or water-in-oil microemulsion per foot of producing zone is introduced into the production well. Fresh water or liquid hydrocarbon can then be injected into the well to displace the soluble oil into the formation surrounding the well. Preferably, the well is allowed to soak for a period of about 2 to 12 hours, and then returned to production. This treatment effectively removes water and organic sludge from the well bore and from the formation immediately surrounding the well, thereby effecting increased oil production.

The invention is further described by the following examples which are illustrative of specific modes of practicing the invention and are not intended as limiting the scope of the invention as defined by the appended claims.

EXAMPLES 1–19

This series of examples illustrates the effect of the gravity and pour point of a crude oil on the quality of the soluble oil produced from the crude oil. The crude oils tested represent a wide variety of crude oil types, gravities, and pour points.

The API gravity and pour point of each crude oil is first determined. Next a substantially anhydrous soluble composition is prepared by admixing 75 volume percent of a selected crude oil, 11.7 volume percent of a surface active agent marketed by the Sonneborn Division of Witco Chemical Company, Inc. under the trademark Petronate RHL, 7.4 volume percent of a surface active agent marketed by the Sonneborn Division of Witco Chemical Company, Inc. under the trademark Pyronate 30, 1.9 volume percent butyl Cellosolve, and 4.0 volume percent water. Petronate RHL is an oil solution containing about 62 percent of preferentially oil-soluble alkyl aryl sulfonates having a molecular weight in the range of 490–510 and not more than about 5 percent water. Pyronate 30 is an aqueous solution containing 30 percent preferentially water-soluble alkyl aryl sulfonates having a molecular weight in the range 330–350.

The crude oils exhibiting gravities below about 27° API and above about 50° API and exhibiting pour points above about 55° F. do not form stable microemulsions on the addition of water to a soluble oil compounded from the crude oil. In particular, the soluble oils formed from crude oils of this type do not form clear, transparent microemulsions on the addition of more then about 10 to 15 volume percent water; and in fact, these microemulsions break down into two distinct phases on the addition of more than about 30 volume percent water.

In contrast, the soluble oils formed from crude oils exhibiting gravities in the range of about 27° to 50° API and pour points less than about 55° F. form clear, transparent microemulsions which are stable and do not separate into distinct phases on the addition of as much as 70 to 80 volume percent water.

EXAMPLE 20

This example illustrates the effect of pour point of a crude oil on the quality of the soluble oil formed from the crude oil.

First, a soluble oil is prepared from a crude oil having a gravity of 35.3° API and a pour point of 20° F. in accordance with the method employed in Examples 1 through 19. The microemulsions formed by the addition of up to 80 volume percent water to this soluble oil are clear and transparent, and are stable in that no phase separation is observed. These microemulsions exhibited viscosities in the range of 25 to 75 centipoise. The soluble oil formed from this crude oil is rated excellent.

Next, molten paraffin is added to another portion of the crude oil to obtain a simulated crude oil having a gravity of 35.0° API and a pour point of 55° F. a soluble oil is then compounded from this simulated crude oil in accordance with the method employed in Examples 1 through 19. Next, water is incrementally added to the soluble oil and the appearance of the resulting microemulsion observed. Above about 15 volume percent added water, the resulting microemulsion is cloudy and opaque, and separation into two phases is noted above about 25 volume percent added water. The microemulsions are gelatinous and too viscous for viscosity measurement. The soluble oil formed from the high pour point simulated crude oil is rated poor.

EXAMPLE 21

A miscible flooding operation is conducted on an oil-containing reservoir in accordance with the method of this invention. Four injection wells are arranged in a rectangular pattern around a single centrally located production well. A substantially anhydrous soluble oil comprised of 72 volume percent crude oil exhibiting a gravity of 39.0° API and a pour point of −65° F., 21 volume percent petroleum sulfonates and 7 volume percent of secondary butyl alcohol is injected into the

TABLE I

| Example number | Crude oil characteristics | | | Microemulsion characteristics | | | |
|---|---|---|---|---|---|---|---|
| | Source | Gravity, °API | Pour point, °F. | Single phase region, water added, volume percent | Viscosity range, cp. | Two phase region, water added, volume percent | Rating |
| 1 | California | 19.2 | −10 | 0 to <10 | >300 | Above 5% | Poor. |
| 2 | do | 23.3 | −25 | 0 to 10 | >100 | Above 10% | Do. |
| 3 | do | 23.4 | −20 | 0 to 10 | >300 | Above 15% | Do. |
| 4 | do | 25.0 | −55 | 0 to 20 | >100 | Above 20% | Do. |
| 5 | Texas | 27.1 | −65 | 0 to 30 | 40 to >100 | Above 40% | Fair. |
| 6 | do | 28.2 | +75 | 0 to <10 | >300 | Above 5% | Poor. |
| 7 | California | 32.8 | −60 | 0 to 80 | 23 to 95 | None | Excellent. |
| 8 | North Dakota | 34.3 | +95 | 0 to <10 | (¹) | Above 10% | Poor. |
| 9 | Alaska | 35.0 | +55 | 0 to 15 | (¹) | Above 25% | Do. |
| 10 | do | 35.3 | +20 | 0 to 80 | 20 to 75 | None | Excellent. |
| 11 | California | 35.8 | +50 | 0 to 80 | 21 to 80 | do | Do. |
| 12 | Texas | 38.9 | −65 | 0 to 70 | 20 to 75 | do | Do. |
| 13 | Illinois | 39.0 | −65 | 0 to 70 | 20 to 75 | do | Do. |
| 14 | Texas | 39.0 | −40 | 0 to 70 | 18 to 75 | do | Do. |
| 15 | Montana | 40.1 | −65 | 0 to 80 | 20 to 85 | do | Do. |
| 16 | do | 42.3 | −65 | 0 to 80 | 20 to 70 | do | Do. |
| 17 | Australia | 48.0 | +20 | 0 to 80 | 15 to 60 | do | Do. |
| 18 | Texas | 50.8 | +5 | 0 to 15 | | Above 80% | Poor. |
| 19 | Louisiana | 52.2 | +15 | 0 to 15 | | Above 25% | Do. |

¹ Gel.

reservoir in an amount equivalent to 0.05 pore volume. Next, there is injected 0.5 pore volume of aqueous flooding medium thickened by the addition of 0.15 weight percent of hydroxyethyl cellulose marketed by the Hercules Powder Company under the trademark Natrasol, followed by unthickened flood water. Oil and other produced fluids are recovered from the central producing well.

EXAMPLE 22

The improvement in water injectivity obtainable by the method of this invention is illustrated by treatment of a water injection well employed in a commercial water flooding operation. The injection well is completed in 9 feet of oil sands with conventional perforated casing. The well had formerly been in oil production service and was recently converted to water injection as part of a large scale flooding operation. The water injection rate stabilized at 43 barrels per day at a surface injection pressure of 750 psig, which rate is less than desired.

The injection well is treated in accordance with the method of this invention by interrupting the flood water injection, injecting 1 barrel of substantially anhydrous soluble oil into the well, and thereafter continuing the injection of flood water. The soluble oil comprises a mixture of about 75 volume percent crude oil exhibiting a gravity of 35.8° API and a pour point of 50° F., 21.3 volume percent mixed alkyl aryl petroleum sulfonates and 3.7 volume percent of diethylene glycol monobutyl ether marketed by Union Carbide Corporation under the trademark butyl Cellosolve. Within a short time after injection of the soluble oil, the water injection rate increased to 235 barrels per day at the same injection pressure.

EXAMPLE 23

This example illustrates the use of the soluble oil compositions of this invention to improve well productivity. The well selected for treatment is completed in a reservoir having a thickness of about 12 feet. Prior to treatment the well is producing about 9 barrels per day of crude oil and 187 barrels per day of water. The well is treated by injecting 24 barrels of a substantially anhydrous soluble oil comprised of a mixture of about 72 volume percent crude oil exhibiting a gravity of 38.9° API and a pour point of −65° F., 21.0 volume percent mixed alkyl aryl petroleum sulfonates, 3.0 volume percent secondary butyl alcohol and about 4.0 volume percent water. Sufficient crude oil is then pumped into the well to clear the soluble oil from the well bore. After a 12 hour soaking period, the well is returned to production. After treatment, the production rate of oil is increased to 14 barrels per day and the water production rate decreased to 112 barrels per day.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In the method of recovering petroleum from a subterranean reservoir in which a displacement fluid miscible with both the connate reservoir oil and with water is injected into the reservoir through an injection well, and thereafter an aqueous flooding medium is injected to drive the displacement fluid towards a spaced production well from which fluids are recovered, the improvement which comprises employing as the displacement fluid a soluble oil comprising an admixture of (1) crude oil exhibiting a gravity between about 27° and 50° API and a pour point below about 55° F.; (2) surface active agent; and (3) partially oxygenated organic stabilizing agent.

2. The method defined in claim 1 wherein said soluble oil is comprised of (1) about 45 to 90° volume percent of said crude oil; (2) about 4 to 30 volume percent surface active agent; and (3) about 0.5 to 8 volume percent partially oxygenated organic stabilizing agent.

3. The method defined in claim 2 wherein said soluble oil contains water in an amount less than about 10 volume percent.

4. The method defined in claim 2 wherein said soluble oil contains from about 10 to 60 volume percent water present in the form of a water-in-oil microemulsion.

5. The method defined in claim 1 wherein said soluble oil is injected in an amount equivalent to 0.01 to 0.15 pore volume.

6. The method defined in claim 1 wherein said surface active agent is an admixture of a preferentially oil-soluble organic sulfonate and a preferentially water-soluble organic sulfonate.

7. The method defined in claim 1 wherein said partially oxygenated organic stabilizing agent is selected from the group consisting of isopropyl and secondary butyl alcohol, methyl ethyl ketone, glycol monoethyl ether, glycol monobutyl ether, and diethylene glycol monobutyl ether.

8. The method defined in claim 1 wherein at least an initial portion of said aqueous flooding medium is increased in viscosity by the addition of a thickening agent.

9. In the method of recovering oil from a subterranean reservoir wherein an aqueous liquid is injected through an injection well and oil is recovered from a spaced production well and wherein the injection of said aqueous liquid is restricted by the presence of oil in the reservoir adjacent to the injection well, the improvement which comprises introducing into said injection well in an amount not greater than about 3 barrels per foot of vertical thickness of said reservoir a soluble oil comprised of an admixture of (1) about 45 to 90 volume percent crude oil exhibiting a gravity between about 27° and 50° API and a pour point below about 55° F.; (2) about 4 to 30 volume percent surface active agent; and (3) about 0.5 to 8 volume percent partially oxygenated organic stabilizing agent.

10. The method defined in claim 9 wherein said soluble oil is substantially anhydrous and contains water in an amount less than about 10 volume percent.

11. The method defined in claim 10 wherein a series of successive quantities of said substantially anhydrous soluble oil and low salt content water are alternately introduced into said well, each of said successive quantities of soluble oil amounting to between about 0.1 to 1.5 barrels per foot of vertical thickness of said reservoir, and thereafter resuming the injection of said aqueous liquid.

12. The method defined in claim 9 wherein said soluble oil contains from about 10 to 60 volume percent water present in the form of a water-in-oil microemulsion.

13. In the method of improving the productivity of a production well completed in an oil-bearing reservoir wherein production from the well is interrupted and a solvent forced into the formation surrounding the well, the improvement which comprises employing as the solvent a soluble oil comprised of an admixture of (1) about 45 to 90 volume percent crude oil exhibiting a gravity between about 27° and 50° API and a pour point below about 55° F.; about 4 to 30 volume percent surfact active agent; and (3) about 0.5 to 8 volume percent partially oxygenated organic stabilizing agent.

14. The method defined in claim 13 wherein said soluble oil is substantially anhydrous and contains water in an amount less than 10 volume percent.

15. The method defined in clam 13 wherein said soluble oil contains from about 10 to 60 volume percent water present in the form of water-in-oil microemulsion.

16. The method defined in claim 13 wherein said soluble oil is introduced into said well in an amount equivalent to about 0.5 to 3.0 barrels of soluble oil per foot of vertical thickness of said reservoir.

* * * * *